US008159738B2

(12) United States Patent
Hoffman et al.

(10) Patent No.: US 8,159,738 B2
(45) Date of Patent: Apr. 17, 2012

(54) LARGE APERTURE POLYMER ELECTRO-OPTIC SHUTTER DEVICE AND METHOD OF MANUFACTURING SAME

(75) Inventors: Robert C. Hoffman, Woodstock, MD (US); Timothy Pritchett, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 129 days.

(21) Appl. No.: 12/816,417

(22) Filed: Jun. 16, 2010

(65) Prior Publication Data

US 2010/0321756 A1    Dec. 23, 2010

Related U.S. Application Data

(60) Provisional application No. 61/218,160, filed on Jun. 18, 2009.

(51) Int. Cl.
*G02F 1/03* (2006.01)
(52) U.S. Cl. ........................................ 359/257; 359/900
(58) Field of Classification Search .................. 359/245, 359/257, 900
See application file for complete search history.

(56) References Cited

U.S. PATENT DOCUMENTS

| | | |
|---|---|---|
| 3,970,967 A | 7/1976 | Iliff |
| 4,211,474 A | 7/1980 | Le Goff |
| 4,277,146 A | 7/1981 | Morgan et al. |
| 4,615,588 A | 10/1986 | Goldhar et al. |
| 4,859,876 A | 8/1989 | Dirk et al. |
| 4,967,268 A | 10/1990 | Lipton et al. |
| 5,026,147 A | 6/1991 | Soan et al. |
| 5,220,451 A | 6/1993 | Gotoh et al. |
| 5,247,055 A | 9/1993 | Stenger-Smith et al. |
| 5,670,871 A | 9/1997 | Man et al. |
| 6,185,033 B1 | 2/2001 | Bosc et al. |
| 6,555,027 B2 | 4/2003 | Wang et al. |
| 6,652,779 B1 | 11/2003 | Zhang et al. |
| 6,782,166 B1 | 8/2004 | Grote et al. |
| 6,852,563 B1 | 2/2005 | Dinu et al. |
| 6,895,162 B2 | 5/2005 | Bintz et al. |
| 7,014,796 B2 | 3/2006 | Jen et al. |
| 7,078,542 B2 | 7/2006 | Jen et al. |
| 7,197,222 B1 | 3/2007 | Koenig |

*Primary Examiner* — Jack Dinh
(74) *Attorney, Agent, or Firm* — Avrom David Spevack; John Raubitschek

(57) ABSTRACT

A large-aperture direct-view high-speed electro-optic shutter includes an electro-optic polymer material constructed to form a Pockels cell and an integrated photoconducting semiconductor switch. A chromophore-doped polymer material or chromophore copolymer, wherein the chromophore is oriented within the polymer material, exhibits a linear electro-optic effect when an electric field is applied to the device. In one embodiment, the polymer host material comprises one or more of a polycarbonate, amorphous polycarbonate, or polymethylmethacrylate polymer hosts. The optically active chromophore comprising one or more coumarin and coumarin derivatives, stilbene or tolane derivatives is incorporated within the polymer host, forming a guest-host polymer. In another embodiment, the chromophore is chemically bonded to the monomer that forms the polymer, resulting in an optically active copolymer. The electro-optic shutter device is then activated by incident light through the photoconducting semiconductor switch, rendering the Pockels cell to have an optical density of at least 3.0.

5 Claims, 14 Drawing Sheets

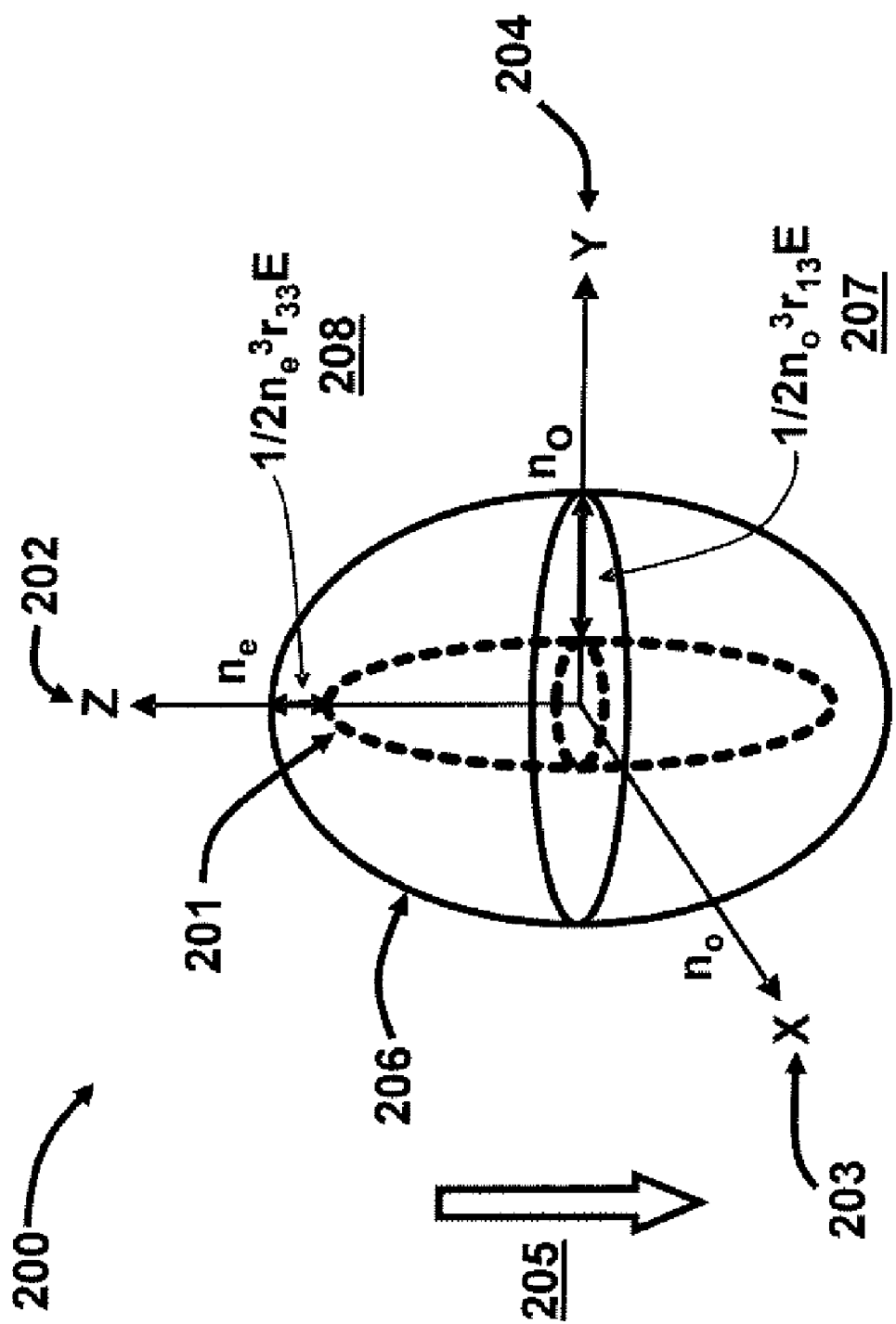

LARGE APERTURE POLYMER ELECTRO-OPTIC SHUTTER DEVICE AND METHOD OF MANUFACTURING SAME

CROSS REFERENCE TO RELATED APPLICATION

This application claims the benefit of U.S. Provisional Patent Application No. 61/218,160 filed on Jun. 18, 2009, the complete disclosure of which, in its entirety, is herein incorporated by reference.

GOVERNMENT INTEREST

The embodiments herein may be manufactured, used, sold, imported and/or licensed by or for the United States Government without the payment of royalties thereon.

BACKGROUND

1. Technical Field

The embodiments herein generally relate to electro-optic technology, and, more particularly, to electro-optic shutter devices.

2. Description of the Related Art

There are various types of conventional optical switches, each of which can be classified as either a passive optical switch or an active optical switch. Typically, a passive optical switch receives incoming light, and changes state based upon the received light. In this regard, some passive optical switches are semiconductors that employ two-photon absorption to activate, while other passive optical switches employ all-optical components and organic dyes. In contrast, active optical switches receive incoming light, and are activated and/or deactivated by a power signal.

Optical switches, as described above, are typically employed in telecommunications and fiber optic technologies, and may employ semiconductors or organic polymers. Typically, active optical switches are not employed to propagate images in a whole, un-encoded state, as this can easily be accomplished with a passive device. However, passive devices tend to suffer from several problems.

For example, although passive devices are inherently fast, their dynamic range is generally very limited, as there are only so many available molecules to respond. Thus, passive devices can saturate quickly. In addition, the fluence or irradiance threshold to turn a conventional passive device to the "on" state may be intolerably high, effectively preventing the device from performing its intended function.

Electro-optic shutters have a quick response time and good attenuation, but conventional active and passive shutters are generally unable to extinguish light evenly over the extent of the electro-optic element. Further, conventional devices are generally passive in nature, in that they use part of the incoming light transient to drive the device to a blocking state. This type of conventional construction has been found to be deficient in speed and effectiveness in blocking optical transients that would be harmful to a human eye or sensor.

SUMMARY

In view of the foregoing, an embodiment herein provides an electro-optic shutter comprising a first polarizer comprising a first polarizer face, and a second polarizer face positioned opposite the first polarizer face; a Pockels cell comprising a first cell face, a second cell face positioned opposite the first cell face, and an outer circumference disposed therebetween, wherein the first cell face of the Pockels cell is disposed adjacent to the second polarizer face of the first polarizer, and wherein the Pockels cell comprises a polymer material comprising a chromophore-doped copolymer or a guest-host polymer; a photo-conducting semiconductor switch (PCSS) in communication with the Pockels cell; a positive electrode in conductive communication with the PCSS; a negative electrode in conductive communication with the PCSS; and a second polarizer comprising a first face, and a second face positioned opposite the first face, wherein the first face of the second polarizer is disposed adjacent to the second cell face of the Pockels cell.

In one embodiment, the polymer material, which may be a poled sheet comprising one or more of a polycarbonate, amorphous polycarbonate, or polymethyl-methacrylate (PMMA) polymer host. In another embodiment, the chromophore-doped copolymer or guest-host polymer comprises one or more of coumarin and coumarin derivatives, or coumaromethacrylate-monomethacrylate copolymer, stilbene or tolane derivatives. Preferably, the chromophore-doped copolymer or guest-host polymer exhibits a linear electro-optic effect upon application of an electric field, the electro-optical activity being greater than approximately 10 pm/V. Furthermore, the chromophore-doped polymer or guest-host polymer preferably exhibits transmission in a visible range of approximately 400 to 700 nm. In another embodiment, the polymer material is optically active. Preferably, the PCSS reacts to light, wherein the light activates the Pockels cell causing it to discharge, and wherein the light-activated Pockels cell has an optical density of at least 3.0.

Another embodiment provides a method of manufacturing an electro-optic shutter device, the method comprising providing a transparent conducting electrode material; depositing a polymer sheet comprising a poling axis on the transparent conducting electrode material to form a polymer/electrode coated sheet having two layers of electrode material; heating the polymer/electrode coated sheet to a glass transition temperature of the polymer/electrode coated sheet; and folding the polymer/electrode coated sheet to form a consolidated unit, a Pockels cell having a poling direction, comprising interdigitated three dimensional electrodes to form the electro-optic shutter device.

Another embodiment provides a method of manufacturing an electro-optic shutter device, the method comprising providing a transparent conducting electrode material; depositing the transparent conducting electrode material on a poled polymer sheet comprising a poling direction, to form a coated polymer sheet having electrode material on a first side thereof, and a non-electrode side opposite the first side; cutting the coated polymer sheet into a plurality of approximately square pieces; bonding each approximately square piece to an adjacent approximately square piece at the non-electrode side to form a consolidated unit having a poling direction; planing and polishing the consolidated unit to transparency; disposing parallel vertical electrodes in the consolidated unit; depositing a common conductor upon the consolidated unit, a Pockels cell having a poling direction, to conductively connect all vertical electrodes to one another to form an electro-optic polymer Pockels cell; and bonding a photo-conducting semiconductor switch to the electro-optic polymer Pockels cell to form the fast shutter device.

Another embodiment provides a large-aperture direct-view high-speed electro-optic shutter includes an electro-optic polymer material forming a Pockels cell and an integrated photoconducting semiconductor switch. A chromophore-doped guest-host polymer material or chromophore-doped copolymer, wherein the chromophore is oriented within the polymer material, exhibits a linear electro-optic effect when an electric field is applied to the device. In one embodiment, the polymer host material comprises one or more of a polycarbonate, amorphous polycarbonate, or polymethylmethacrylate polymer hosts. The optically active chromophore comprising one or more coumarin and coumarin derivatives, stilbene or tolane derivatives is incorporated within the polymer host, forming a guest-host polymer. In another embodiment, the chromophore is chemically bonded to the monomer that forms the polymer, resulting in an optically active copolymer. The electro-optic shutter is then activated by incident light through the photoconducting semiconductor switch, rendering the electro-optic shutter opaque.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3 is a modified index ellipsoid of an electro-optic polymer according to an embodiment herein;

DETAILED DESCRIPTION OF PREFERRED EMBODIMENTS

Figure 1:
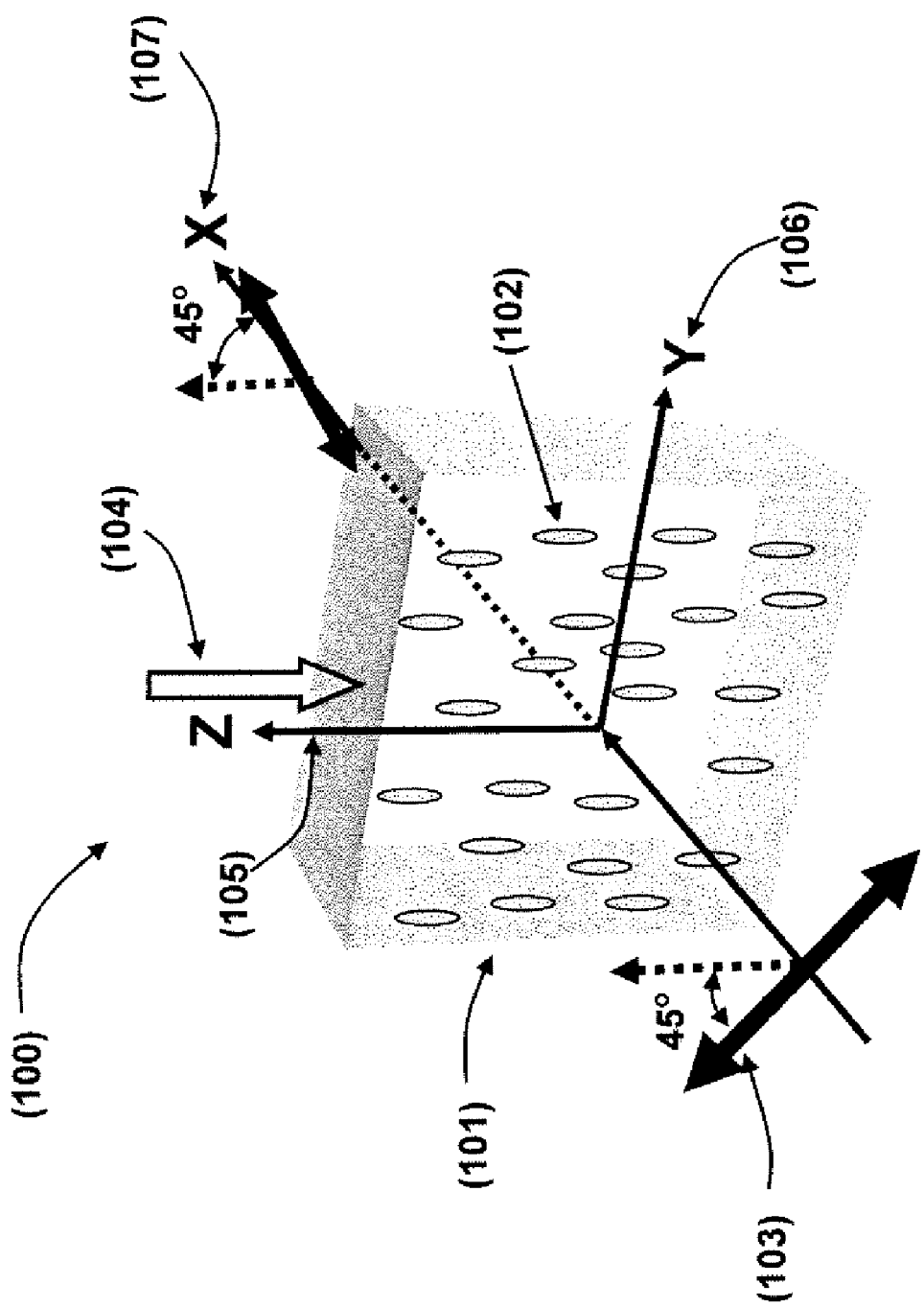
FIG. 1 is a partial perspective view of a Pockels cell device according to an embodiment herein.

The embodiments herein, and the various features and advantageous details thereof, are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide an improved high-speed electro-optic shutter having a fast response time and good attenuation, while also being capable of extinguishing light evenly over the extent of the electro-optic element. Furthermore, the embodiments herein provide a Pockels cell based electro-optic shutter device capable of blocking optical transients to such an extent that damage to eyes and sensors does not occur. Referring now to the drawings, and more particularly to FIGS. 1 through 14, where similar reference characters denote corresponding features consistently throughout the figures, there are shown preferred embodiments.

The Pockels effect is exhibited in chromophore-doped polymers. Specifically, certain crystals and polymers exhibit a linear electro-optic effect, such that birefringence occurs when the crystal is placed in an electric field. The induced birefringence is proportional to the applied electric field, and is due to the deformation of the indicatrix (index ellipsoid) due to the applied field. When a strong external electric field E is applied, the indicatrix is distorted; the length of the principal axes is modified and the orientation of the indicatrix is also modified as indicated:

$$\kappa' = \kappa + r \blacksquare E \tag{Eq. 1}$$

where r is the Pockels electro-optic tensor.

The indicatrix is renormalized to the new field. The form of a Pockels electro-optic tensor for a guest-host polymer of $C_{\infty v}$ symmetry is shown in Equation (2) below. Such a material behaves as a uniaxial crystal. The Pockels electro-optic tensor is a third-rank tensor that is symmetrical in the first two indices, and generally contains 18 independent components. The $C_{\infty v}$ symmetry reduces the number of independent components to two, since the non-vanishing components $r_{13}$, $r_{23}$, $r_{42}$, and $r_{51}$ are all equal:

$$\begin{pmatrix} (\Delta\kappa)_1 \\ (\Delta\kappa)_2 \\ (\Delta\kappa)_3 \\ (\Delta\kappa)_4 \\ (\Delta\kappa)_5 \\ (\Delta\kappa)_6 \end{pmatrix} = \begin{pmatrix} 0 & 0 & r_{13} \\ 0 & 0 & r_{23} \\ 0 & 0 & r_{33} \\ 0 & r_{42} & 0 \\ r_{51} & 0 & 0 \\ 0 & 0 & 0 \end{pmatrix} \begin{pmatrix} E_x \\ E_y \\ E_z \end{pmatrix}. \tag{Eq. 2}$$

Prior attempts at creating large area Pockels-based shutter devices have used plasma electrodes and other contrivances to circumvent the problem of obscuration of the central aperture by the electrode. The requirement of a clear central aperture having low losses is due to the necessity of having lossless intracavity elements for a laser. As a fast shutter not used as a laser intracavity element, the large aperture direct-view Pockels devices face no such restriction.

The embodiments herein provide a novel Pockels cell device 100, and an electro-optic shutter comprising such a Pockels cell device. The Pockels cell device of the embodiments herein comprises a chromophore-doped polymer. The Pockels cell device (i.e., the electro-optic element) operates as a half wave plate when a voltage $V_\pi$ is applied to the element, and has two opposing transverse surfaces. The chromophore-doped polymer is comprised of a polymer material, which acts as the substrate. In particular, the polymer material (i.e., the substrate) comprises, but is not limited to, one or more of a polycarbonate, amorphous polycarbonate, or polymethylmethacrylate (PMMA) polymer host. Preferably, the polymer is doped with, but is not limited to, one or more of coumarin and coumarin derivatives, stilbene or tolane derivatives in the form of a chromophore-doped guest-host polymer or chromophore-doped copolymer system.

In particular, as illustrated in FIG. 1, a Pockels cell device 100 is provided, wherein the crystal axes are oriented as shown. The chromophore-doped polymer 101 contains oriented chromophores 102, which exhibit a linear electro-optic effect (Pockels effect) under the influence of an applied electric field 104. A new index ellipsoid is formed under the influence of the applied field 104. The incident polarized light 103 propagates parallel to the x-axis 107; the y and z axes of the device 100 are shown as 106 and 105, respectively.

Figure 2A:
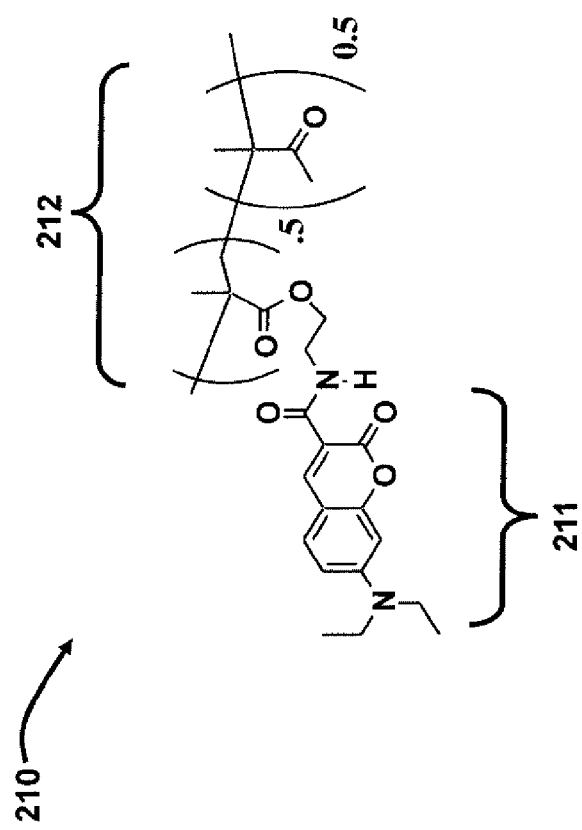
FIGS. 2A-C are an illustration of preferred chromophore compounds contained within a Pockels cell device according to an embodiment herein.
Figure 2C:
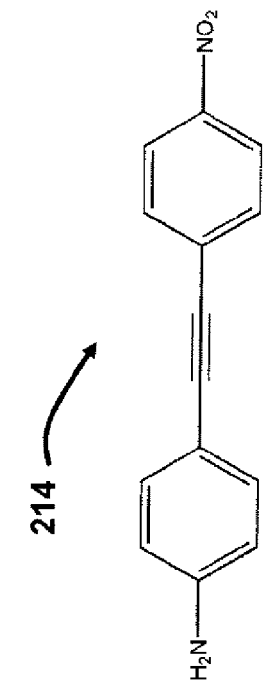
Figure 2B:
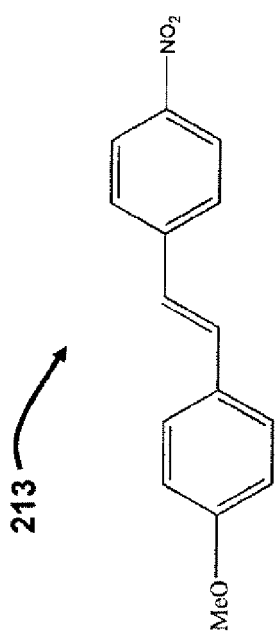

As illustrated in FIGS. 2A-C, the oriented chromophores are preferably chromophores 210, being specifically designed to have high electro-optical activity and transmission in the visible region, 400 to 700 nm. In FIG. 2A, the chromophore 210 is a coumarin derivative 211, which is attached to the polymer 212, polymethylmethacrylate (PMMA) resulting in a copolymer. In FIG. 2B, the chromophore is a stilbene derivative, specifically methoxynitrostilbene 213 and in FIG. 2C, the chromophore is a tolane derivative, specifically aminonitrotolane 214. Alternatively, the chromophore may be simply dissolved in the polymer host, resulting in a guest-host system.

The incident polarized light 103, as illustrated in FIG. 1, polarized 45° to the z-axis 105, can be resolved into two s and p polarized components, oriented 45° either side of the z-axis 105 of the poled polymer. One component is advanced by $\lambda/4$ and the other component is delayed by $\lambda/4$. The result is a total phase difference of $\lambda/2$, which rotates the incoming polarization 90° (illustrated as x-axis 107). The phase shift $\Delta\phi$ that occurs if light is passed through the poled polymer in the direction of the applied electric field is written as below:

$$\Delta\phi = 2\pi/\lambda_0 [n_e - n_o] L \quad \text{(Eq. 3);}$$

where $\Delta\phi$ is the phase shift (in radians) of the light of wavelength $\lambda_0$ (units of m); $n_o$ is the ordinary refractive index (dimensionless quantity) of the Pockels medium at wavelength $\lambda_0$ (units of m); $n_e$ is the extra-ordinary refractive index (dimensionless quantity) at wavelength $\lambda_0$ (units of m); $r_{33}$ and $r_{31}$ are the particular electro-optic constants for the Pockels material (units of m/V); and V is the applied voltage (units of V). The "half wave" voltage $V_\pi$ follows from the equation below:

$$V_\pi = d\lambda_0 / L(r_{33}n_e^3 - r_{13}n_o^3) \quad \text{(Eq. 4).}$$

This voltage is on the order of several hundred volts to several kilovolts in a practical device, and scales in a linear fashion with wavelength. The modified index ellipsoid 200 is illustrated in FIG. 3. The z, x and y axes are shown as 202, 203, and 204, respectively. Under the influence of an applied field 205, the original index ellipsoid 201 is modified to a new index ellipsoid 206. The extra-ordinary axis (z-axis 202) is changed by $\frac{1}{2}n_e^3 r_{33} E$ (208) and the ordinary axis (y-axis 204) is changed by $\frac{1}{2}n_e^3 r_{13} E$ (207). The total effective change (from Equation (4)) is the difference $r_{33}n_e^3 - r_{13}n_o^3$.

Examples of EO polymers with high EO coefficients are the Lumera DH series of chromophores based on a dialkoxythiophene type structure. The DH series of chromophores include DH6, DH10, DH13, DH28, all having EO coefficients>40 pm/V in a polycarbonate host. All these chromophore structures are based upon the 2',2'-dicyanomethylen-3-cyano-4,5,5-trimethyl-2,5-dihydrofuran (TCF) molecule. Various moieties on the TCF structure are altered to form the DH-series of materials.

Most research to date has focused on telecommunications applications requiring low loss and high EO coefficient at 1.3 to 1.5 µm. Some of these near-infrared materials may be suitable for this application when used in films less than 10 µm in thickness. However, the embodiments herein provide chromophore copolymer-doped polymer exhibiting a high transmission rate of from 400 to 700 nm, along with a high EO coefficient in excess of 10 pm/V.

Figure 4:
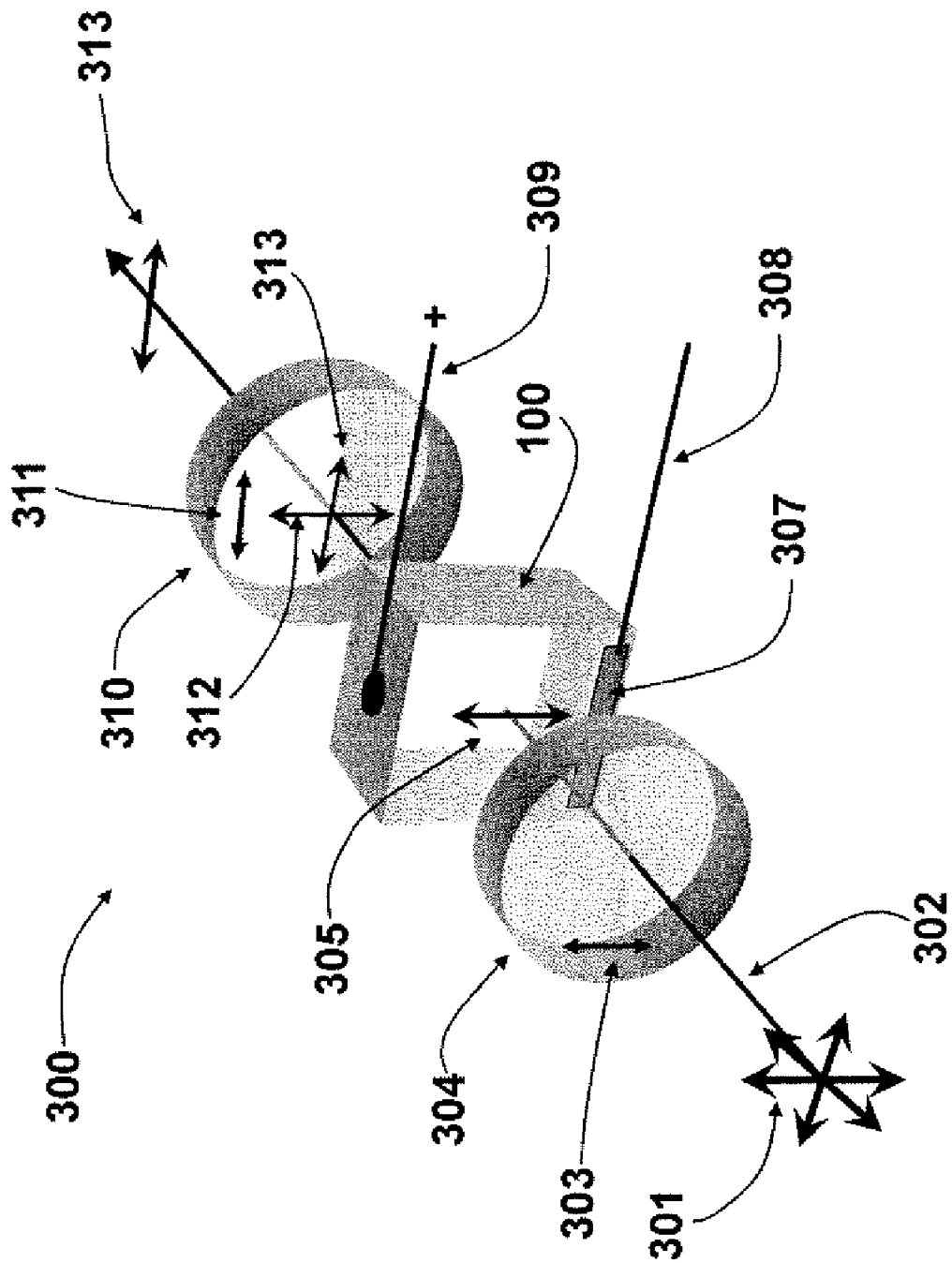
FIG. 4 is an exploded perspective view of an electro-optic shutter device according to an embodiment herein.

The electro-optic shutter device 300 of the embodiments herein, as shown in FIG. 4, comprises the above-described Pockels cell device 100, is comprised of a first polarizer 304 having a first face, and a second face opposite the first face. The Pockels cell device 100 (i.e., the electro-optic element of an electro-optic shutter) has a first face, a second face opposite the first face, and an outer circumference disposed therebetween, the first face of the Pockels cell device 100 is disposed adjacent to the second face of the first polarizer 304. The Pockels cell device 100 (i.e., the electro-optic element) operates as a half wave plate when a voltage $V_\pi$ is applied to the element, and has two opposing transverse surfaces.

A photo-conducting semiconductor switch (PCSS) 307 is disposed in communication with the Pockels cell device 100. The PCSS 307 further is in conductive communication with a positive electrode 309 and a negative electrode 308. Disposed adjacent to the second face of the Pockels cell device 100 is a second polarizer 310 having a first face, and a second face opposite the first face.

The first polarizer 304 is disposed adjacent to one transverse surface of the Pockels cell device 100 (i.e., the electro-optic element) and has a first transmission axis oriented 45° relative to the z-axis of the poled polymer. The second polarizer 310 is disposed adjacent to the other transverse surface of the Pockels cell device 100 (i.e., the electro-optic element) and has a second transmission axis 90° different than the first transmission axis. Each electrode 308, 309 is disposed on one of the transverse surfaces of the Pockels cell device 100 (i.e., the electro-optic element), and has an electric field which is substantially uniform over the transverse extent of the Pockels cell device 100 (i.e., the electro-optic element).

Unpolarized light 301 propagating along axis 302 enters the first polarizer 304 with polarization axis 303. Vertically polarized light 305, corresponding with the $n_e$ axis 202, shown in FIG. 4, enters the Pockels cell device 100. Part of the incident light activates the PCSS 307. The PCSS 307 causes the negative electrode 308 and the positive electrode 309 to discharge the Pockels cell device 100.

If the intensity of the polarized light 305 is insufficient to trigger the PCSS 307, the light exits the Pockels cell device 100 as 45° polarized light 313, and passes through the second polarizer 310 having a polarization axis 311. However, if the intensity of the light 305 is sufficient to trigger the PCSS 307 to discharge the Pockels cell device 100, the light exits the Pockels cell device 100 as polarized light 312, which is 90° from the original polarized light 313 and is blocked by the second polarizer 310 having a polarization axis 311. This configuration is embodied as a normally on or normally transparent device.

Figure 5:
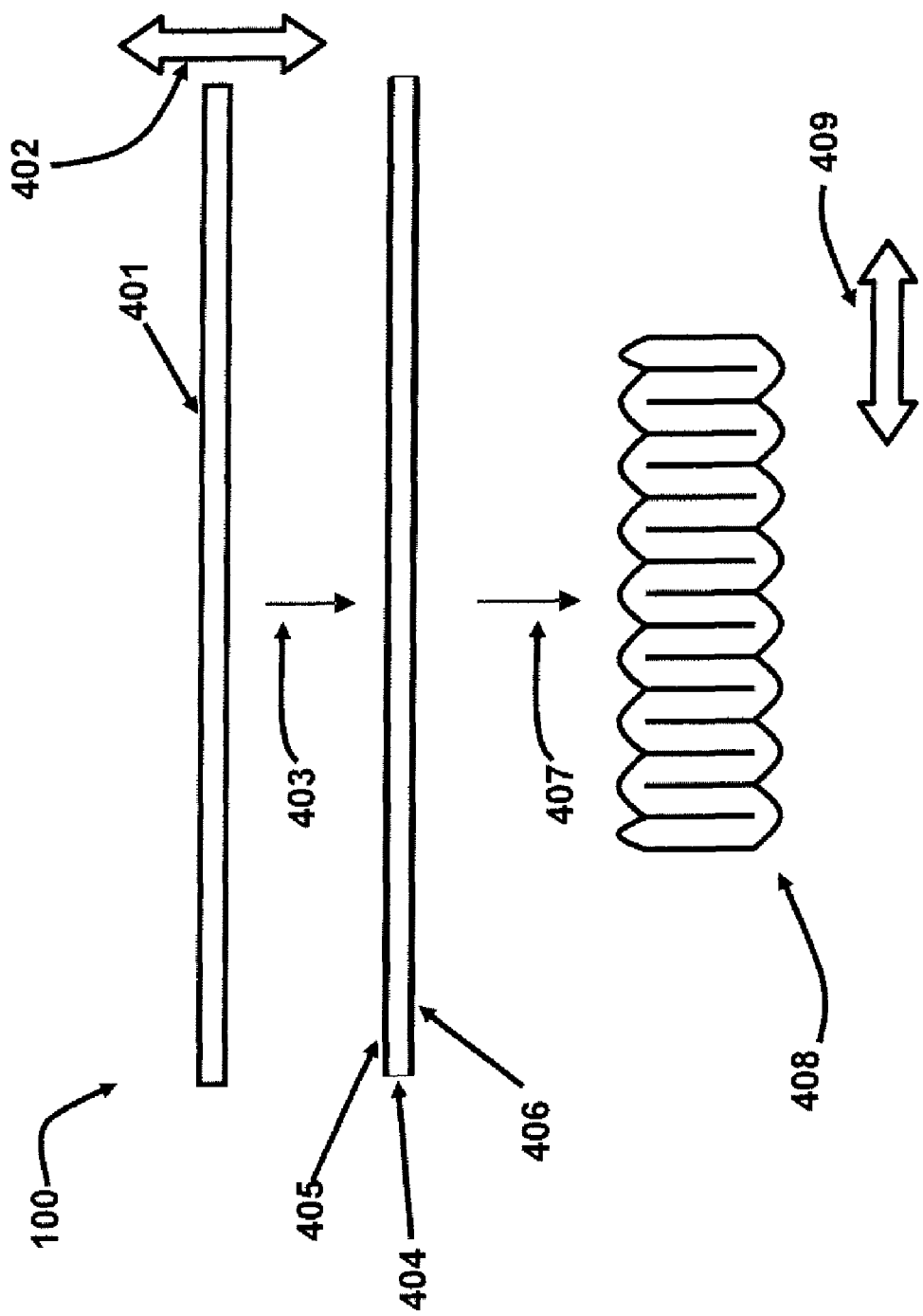
FIG. 5 is a side view illustration of one method of manufacturing an electro-optic shutter according to an embodiment herein.

An example of a Pockels cell device 100 used in accordance with the embodiments herein may be manufactured as illustrated in FIG. 5. In particular, a polymer sheet 401, comprised of the chromophore-doped copolymer or guest-host polymer 101 of the embodiments herein, having a poling axis 402, is deposited, in step 403, on a transparent conducting electrode material 405 and 406, such as, but not limited to, Indium Tin Oxide (ITO) or Baytron® conductive polymer, as non-limiting examples, so as to form a coated sheet 404. Specifically, the coated sheet 404 has two layers of electrode material, 405 and 406, respectively, deposited thereon.

Polymer sheet 401 is fabricated by dissolving a chromophore 210 in a suitable polymer 212 such as, but not limited to, PMMA. This mixing process is performed while the polymer 212 is heated above its glass transition temperature ($T_g$), the temperature at which the polymer becomes soft enough to accommodate the chromophore 210. The resulting mixture is referred to as a guest-host polymer. The guest-host polymer remains heated above the glass transition temperature to allow forming by rollers, sheet extrusion, or other suitable polymer-melt processing technique to form a sheet of the desired thickness.

In the case of copolymers 212-214, such as shown in FIGS. 2A-C, the copolymers are synthesized according to known techniques and heated above the glass transition temperature to allow forming by rollers, sheet extrusion, or other polymer melt processing technique to form a sheet of the desired thickness.

At this point, the polymer sheet 401 may be poled. In other words, the polymer sheet 401 has its constituent chromophore molecules aligned in the proper direction by the application of a high voltage electric field to folded structure 408 during step 407. The high voltage is applied to the top and bottom surfaces of structure 408 to form a chromophore aligning field in the direction of arrow 409. Alternatively, in process 419, shown in FIG. 6, the field is applied to structure 420 by applied positive and negative high voltage to alternate electrodes; i.e. even electrodes are negative and odd ones are positive. The resulting chromophore poling field 421 is perpendicular to the spacing of the electrodes.

The polymer/electrode coated sheet 404 is then heated to its glass transition temperature, as illustrated in step 407 in FIG. 5. The resulting polymer electrode coated sheet 404 is then folded to form a consolidated unit 408, having interdigitated three dimensional electrodes having a poling direction 409.

Figure 6:
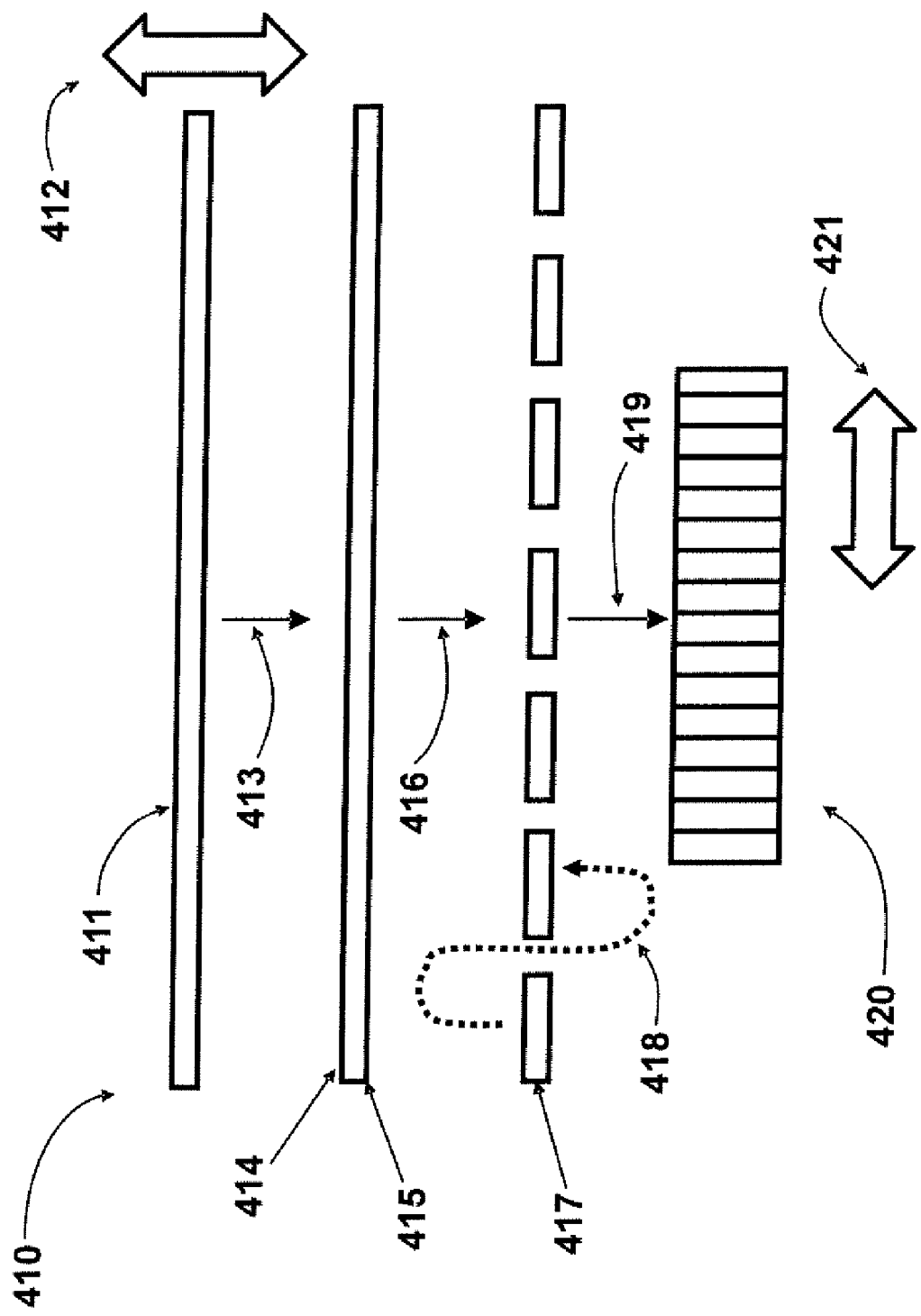
FIG. 6 is a side view illustration of an alternative method of manufacturing an electro-optic shutter according to an embodiment herein.

Alternatively, as shown in FIG. 6, the Pockels cell device 100 of the embodiments herein may be manufactured using process 410, wherein a poled polymer sheet 411, having poling direction 412, has, in step 413, a transparent conducting electrode material 414, such as, but not limited to, Indium Tin Oxide (ITO) or Baytron® conductive polymer, as non-limiting examples, deposited thereon, so as to form a coated polymer sheet 415. This poled polymer sheet 411 is comprised of the chromophore copolymer described herein. The coated polymer sheet 415 has an electrode material 414 on only one side thereof.

Then, in step 416, the coated polymer sheet 415 is cut into a plurality of approximately square pieces 417. The approximately square pieces 417 are then each bonded to the non-electrode side of the adjacent square piece, as illustrated by step 418. The approximately square pieces 417 may be bonded to one another using cyanoacrylate cement, as a non-limiting example. However, any suitable conventional means of bonding may be used. Then, in step 419, all of the approximately square pieces 417 are bonded together to form a consolidated unit 420 having poling direction 421.

Figure 7:
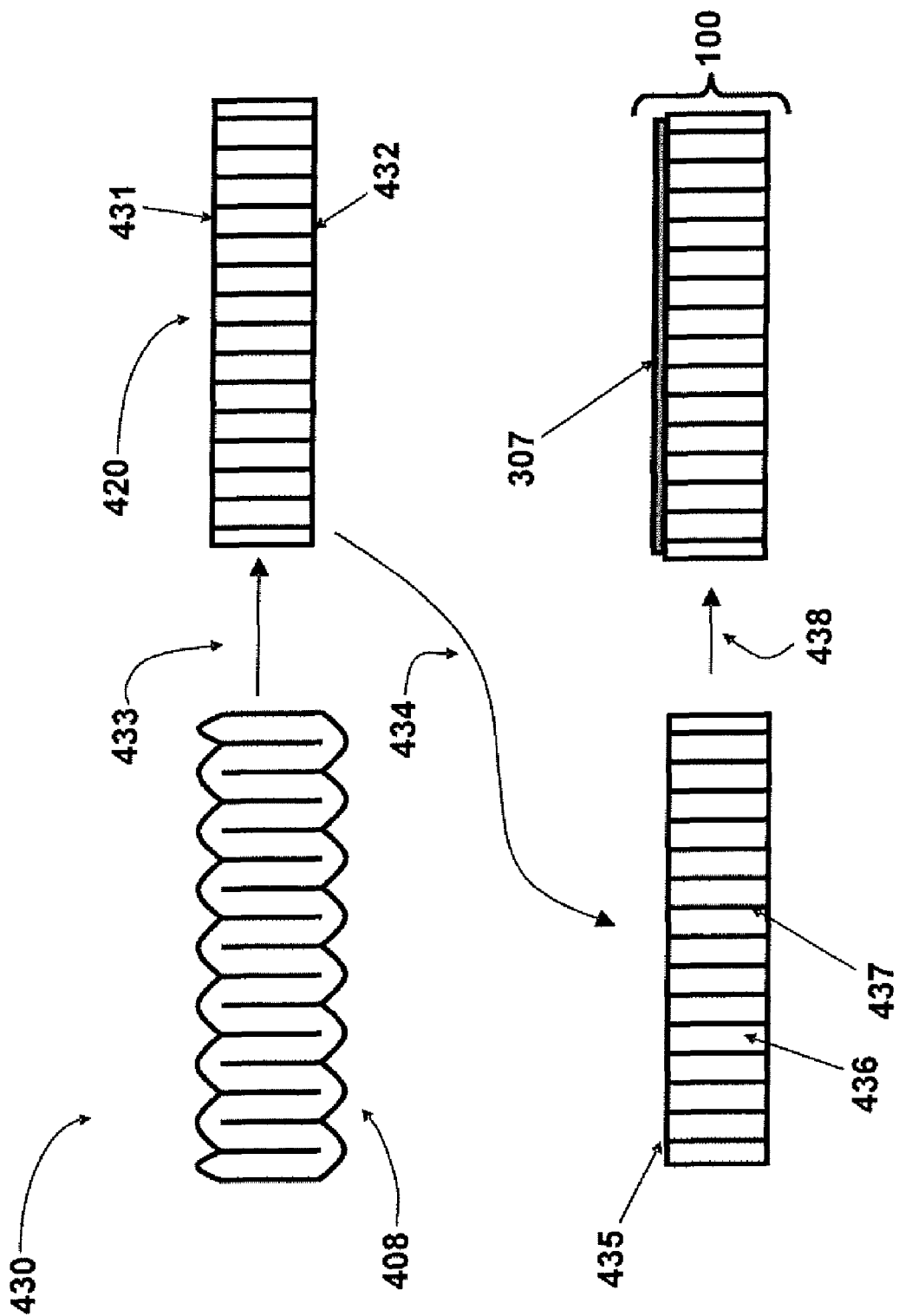
FIG. 7 is a side view illustration of a polishing step and PCSS connecting step involved in manufacturing an electro-optic shutter according to an embodiment herein.

Consolidated unit 408, as illustrated in FIG. 5, and consolidated unit 420, as illustrated in FIG. 6, now enter the next step of the manufacturing process 430, which is the planarization of the poled sheet as illustrated in FIG. 7. In particular, consolidated unit 408 and consolidated unit 420 have both surfaces 431 and 432 planed and polished to transparency, as illustrated by step 433. Through step 433 (i.e., the polishing process), both consolidated unit 408 and consolidated unit 420 end up with the same configuration. Then, in step 434, the individual parallel vertical electrodes 437 of each individual approximately square piece 417 (shown in FIG. 6) are operatively connected by common conductors 435. The resulting electro-optic polymer 436 may be poled at this step, if necessary. Then, in step 438, the PCSS 307 is bonded and connected to the electro-optic polymer 436 to form the Pockels cell device 100 of the embodiments herein.

Figure 8:
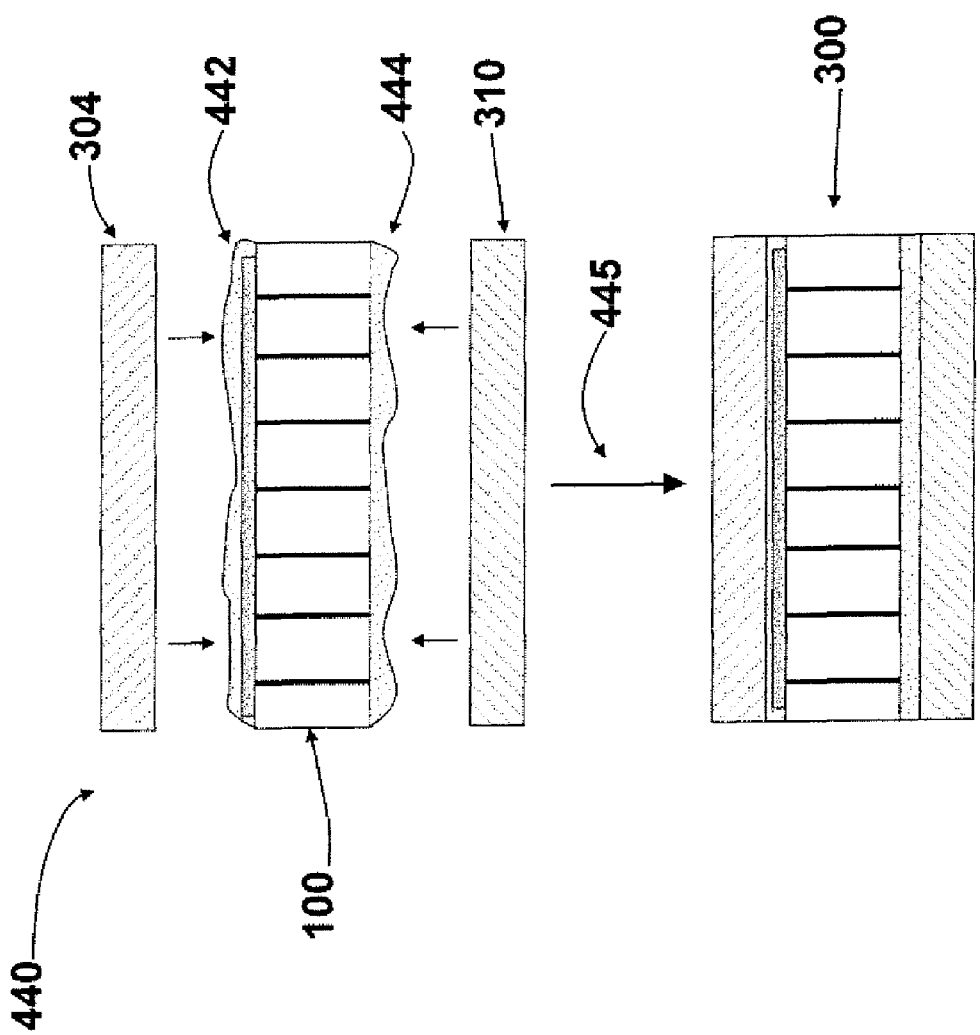
FIG. 8 is a side view illustration of a polarizer bonding step involved in manufacturing a completed electro-optic shutter device according to an embodiment herein.

To form the completed electro-optic shutter device 300 of the embodiments herein, as shown in FIG. 8, in process 440, the first polarizer 304 is bonded to the Pockels cell device 100 using an optical adhesive 442, by coating the optical adhesive 442 on the Pockels cell device 100, and applying pressure to the first polarizer 304 in the direction shown. Similarly, the second polarizer 310 is bonded to the Pockels cell device 100 using an optical adhesive 444, by applying optical adhesive 444 to the Pockels cell device, and applying pressure to the second polarizer 310 in the direction shown. The first polarizer 304 and the second polarizer 310 are oriented in a crossed configuration. Finally, in step 445, curing to remove voids and bubbles is carried out to yield a finished electro-optic shutter device 300.

Figure 9A:
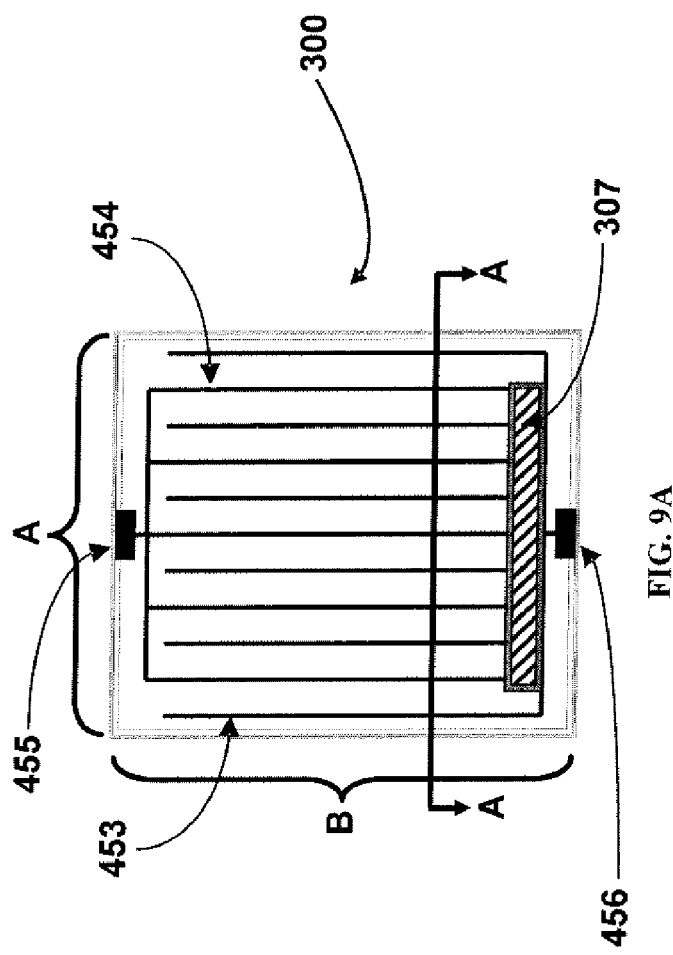
FIG. 9A is a top view of a completed electro-optic shutter device according to an embodiment herein.
Figure 9B:
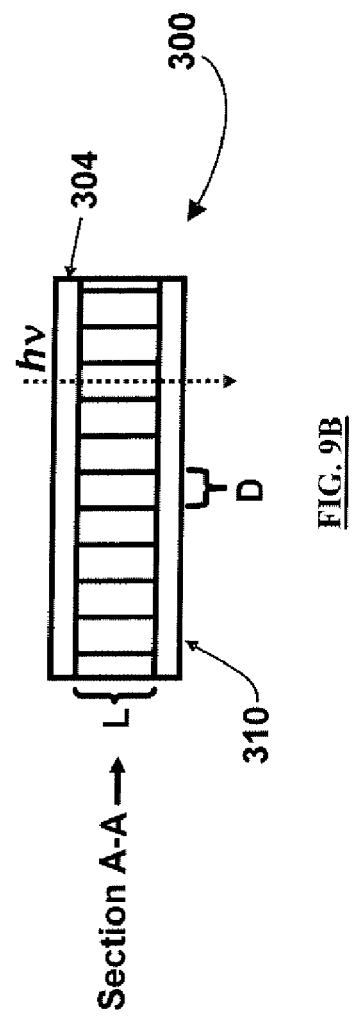
FIG. 9B is a cross-sectional view of section A-A of the electro-optic shutter device of FIG. 9A according to an embodiment herein.

As illustrated in FIGS. 9A and 9B, the electro-optic shutter device 300 of the embodiments herein is comprised of the Pockels cell device having the PCSS 307 bonded thereto. The dimensions A and B of the electro-optic shutter are variable, and determined by the application. In one non-limiting example, the dimensions A and B are on the order of 1 cm. Three-dimensional interdigitated electrodes 453 and 454 are connected to a high voltage source by pads 455 and 456.

A cross-sectional view of the electro-optic shutter device 300 through A-A shows the thickness L (from Equation (4)), and is generally approximately millimeters, but may be tailored to the desired application. Likewise, the electrode spacing D is generally approximately, but not limited to, 0.5 to 1.0 mm, and may be tailored to the desired application. Light propagates through the device 300 in the direction shown through second polarizer 310 and first polarizer 304.

Figure 10:
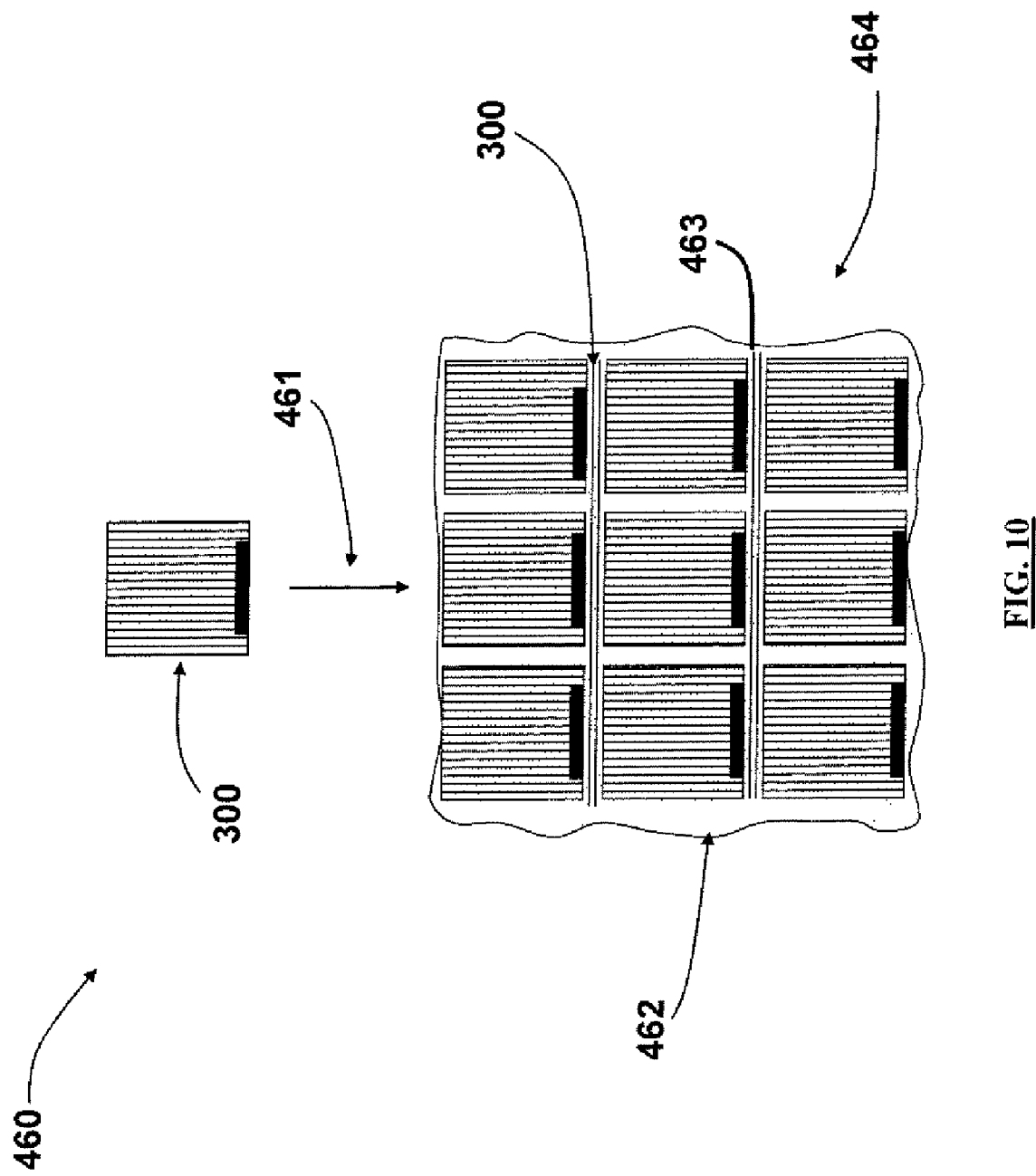
FIG. 10 is a front view of a conformable array comprised of a plurality of electro-optic shutter devices according to an embodiment herein.

As illustrated in FIG. 10, in the general process 460, a completed unit can be assembled in a mosaic-like fashion, by assembling a plurality of electro-optic shutter devices 300 together. In particular, in process 461, the individual electro-optic shutter devices 300 are bonded to a suitable substrate, adjacent to one another, to form a conformable array 464. The bonding can be accomplished using a silicone-based adhesive 462 or similar material. Preferably, the adhesive used is sufficiently rigid to support the deposition of electrically conducting strips 463. The strips 463 carry the electrical charge necessary to operate the individual electro optic elements 300. The individual electro-optic shutter elements 300 can be joined to form a curved element, if desired.

Figure 11:
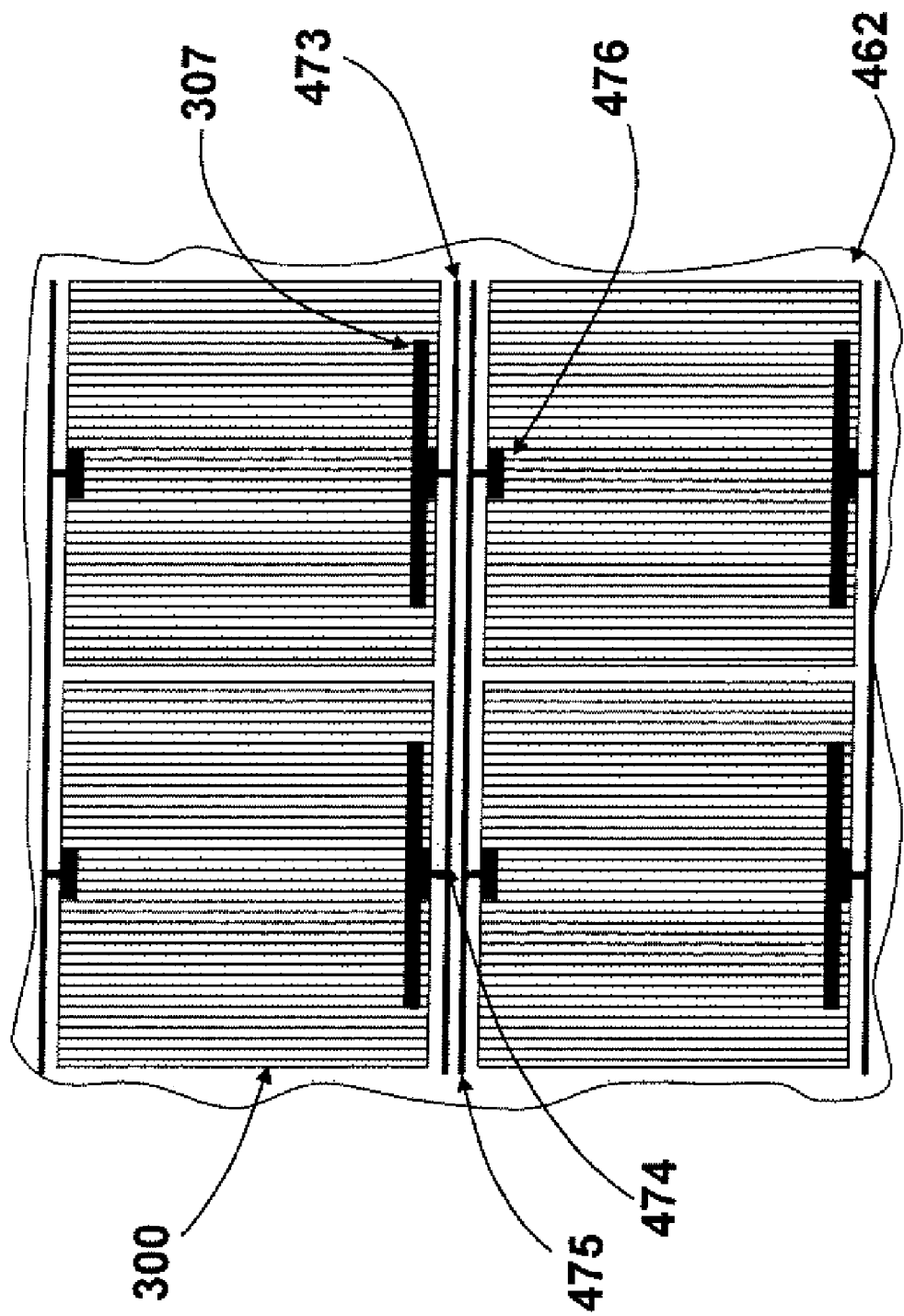
FIG. 11 is a partial magnified view of the conformable array illustrated in FIG. 10 according to an embodiment herein.

As illustrated in FIG. 11, which is an expanded view of the array 464 of joined electro-optic elements cell shown in FIG. 10, the electro optic shutter elements 300 are embedded in an insulating adhesive material 462. The electrically conducting strips 463 in FIG. 10 are split into 473 and 475 as described in FIG. 11. Ground common connector strip 473 carries an electrical charge via a smaller conducting strip 474 to the PCSS 307. Another parallel strip, a positive common connector 475, carries an opposite electrical charge to the opposing electrodes of the electro-optic shutter elements 300 via a strip 474 attached to a pad 476. The connectors 473 and 475 are potted within the insulating adhesive material 462, so as to protect the user against electrical shock.

Figure 12:
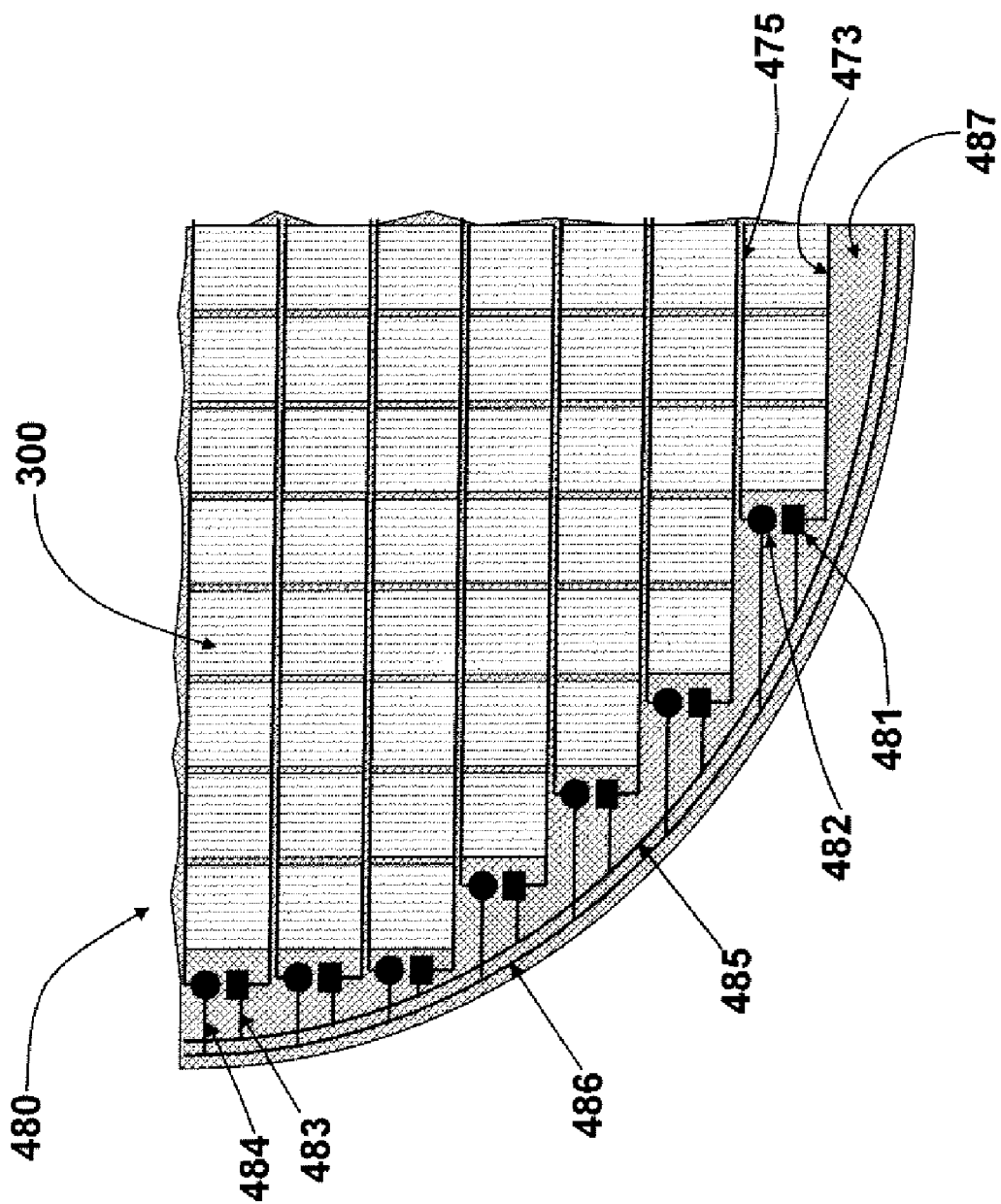
FIG. 12 is a partial view of one quadrant of an assembled array of electro-optic shutter devices according to an embodiment herein.

FIG. 12 shows one quadrant of an assembled array 480 of electro-optic shutter devices 300. The electro-optic shutter devices 300 are potted in an opaque electrically insulating polymer 487 that stabilizes the electro-optic shutter elements 300 against movement, and prevents unwanted light from passing around the electro-optic shutter elements 300. Each row of electro-optic shutter elements 300 is connected electrically by a positive common connector 475 and common ground connector 473. The common connectors 473 and 475 terminate in a positive pad 482 and ground pad 481 that allow electrical connection to the high voltage positive bus 486 and ground bus 485. The connections to the positive high voltage bus 486 are accomplished by positive conducting strip 484, and the connections to the ground bus are accomplished by ground conducting strip 483. These conducting strips can be fabricated using known circuit board fabrication techniques.

Figure 13:
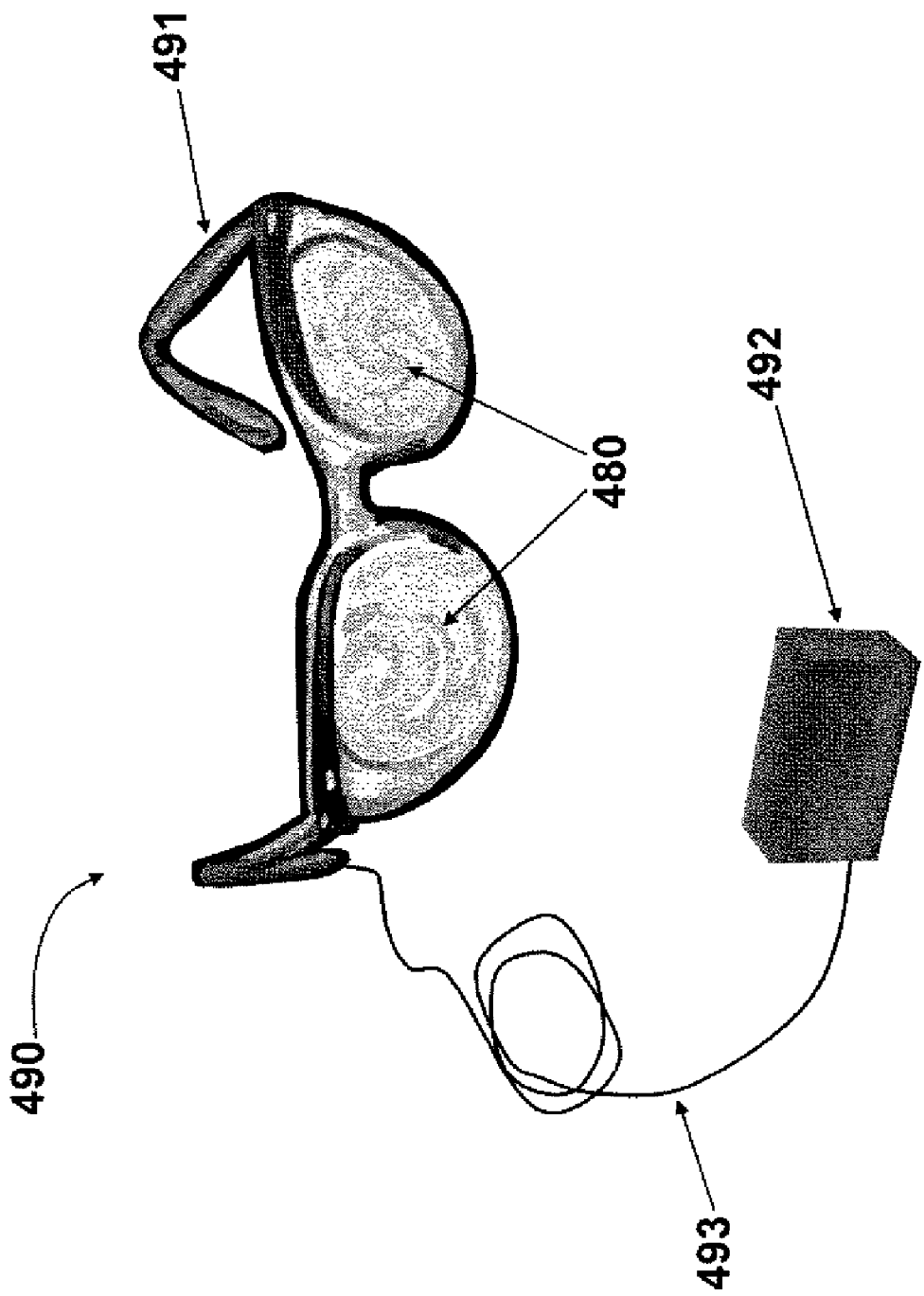
FIG. 13 is a schematic diagram illustrating an example application of an electro-optic shutter device according to an embodiment herein.

FIG. 13 illustrates an example application of the electro-optic shutter device of the embodiments herein. In particular, in FIG. 13, two completed lens assemblies (i.e., array 480 of electro-optic shutter devices) are attached to an eyeglass frame 491. Two assemblies (i.e., array 480) are used to complete the device 490. The completed optical device 490 may include opaque side shields or other desired aesthetic features. The positive and ground conducting buses 486 and 485, as shown in FIG. 12, are connected in parallel within the eyeglass frame 491, terminating in one of the earpieces of the eyeglass frame 491.

Figure 14:
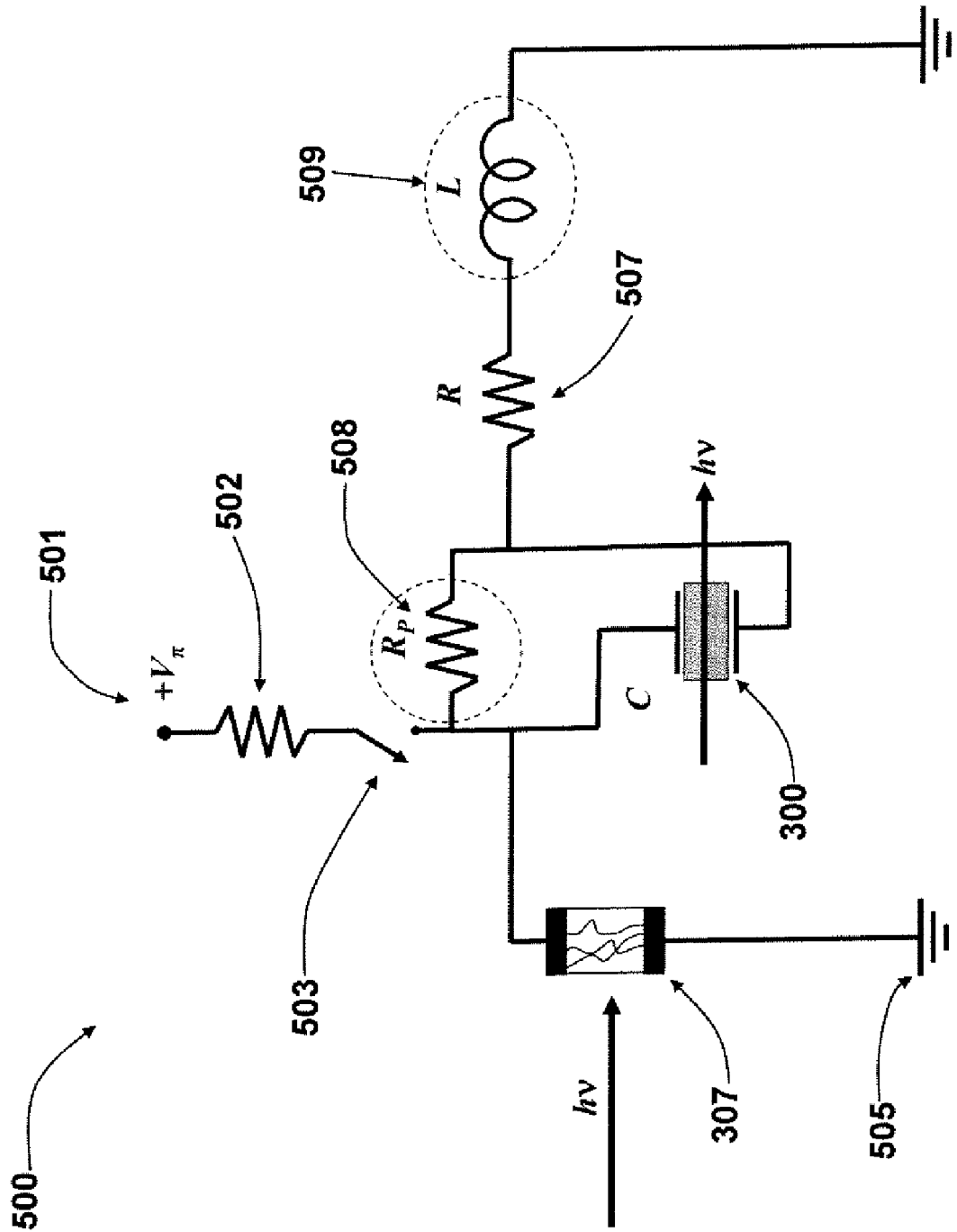
FIG. 14 is a circuit diagram of the circuit box of FIG. 13 according to an embodiment herein.

An insulated wire pair 493 connects the eyeglass frame 491 to a compact circuit box 492. The circuit box 492 contains various circuit elements 500, as shown in FIG. 14, and contains an on-off switch 503, a 9-volt battery connected to a commercially available compact high voltage power supply (not shown) applied to positive terminal 501. The high voltage applied to terminal 501 passes through a charging resistor 502 and applies the high voltage to the electro-optic shutter elements 300.

The resistor 507 allows the designer to tune the circuit for critically damped operation to maximize the efficacy of the device (i.e., device 490 of FIG. 13). The resistor 508 and inductor 509 are not actual discrete circuit elements, but describe the innate resistance and inductance contained within the electro-optic shutter element 300. The elements of the PCSS 307 are contained within the electro-optic shutter element 300 as previously described. The elements of the PCSS 307, when illuminated with light, cause the discharge of the electro-optic shutter element 300 to ground 505, thus activating the device (i.e., device 490 of FIG. 13) as described above.

The Pockels cell device 100 provided by the embodiments herein operates with very fast electrical pulses (sub-nanosecond), and provides a significant advantage in speed over conventional mechanical shutters. Further, the device 100 provides for a higher attenuation than conventional passive chemical dye-based shutters. As discussed above, the Pockels cell device 100 provided by the embodiments herein may be incorporated in a thin, flexible electro-optic shutter device 300 composed entirely of a solid-state polymer.

The Pockels cell device 100 provided by the embodiments herein, as well as the electro-optical shutter device 300 comprising same, may be utilized in any application requiring very rapid blocking of an optical transient, including protection from damaging laser pulses from the millisecond regime to the nanosecond regime, and even to block pulses down to the femtosecond regime. In particular, the Pockels cell device 100 and electro-optical shutter device 300 provided by the embodiments herein provide excellent eye and sensor protection.

Those skilled in the art will recognize that the Pockels cell device 100, the electro-optic shutter device 300, and the method of manufacturing same, as provided by the embodiments herein, have many diverse applications and that the embodiments herein are not limited to the representative examples disclosed herein. Accordingly, the foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of manufacturing an electro-optic shutter device, said method comprising:

providing a transparent conducting electrode material;

depositing said transparent conducting electrode material on a poled polymer sheet comprising a poling direction, to form a coated polymer sheet having electrode material on a first side thereof, and a non-electrode side opposite said first side;

cutting said coated polymer sheet into a plurality of approximately square pieces;

bonding each approximately square piece to an adjacent approximately square piece at said non-electrode side to form a consolidated unit having a poling direction;

planing and polishing said consolidated unit to transparency;

disposing parallel vertical electrodes in said consolidated unit;

depositing a common conductor upon said consolidated unit to conductively connect all vertical electrodes to one another to form an electro-optic polymer Pockels device; and bonding a photo-conducting semiconductor switch to said electro-optic polymer to form a basic completed fast shutter.

2. The method of claim 1, wherein said poled polymer sheet comprises a chromophore-doped guest-host polymer or chromophore-doped copolymer comprising a polymer material comprising one or more of a polycarbonate, amorphous polycarbonate, or polymethylmethacrylate (PMMA) polymer host.

3. The method of claim 2, wherein said chromophore-doped copolymer or guest-host polymer comprises one or more of coumarin and coumarin derivatives, coumaromethacrylate-monomethacrylate copolymer, stilbene or tolane derivatives.

4. The method of claim 2, wherein said chromophore copolymer-doped polymer or guest-host polymer exhibits electro-optical activity greater than approximately 10 pm/V.

5. The method of claim 2, wherein said chromophore copolymer-doped polymer or guest-host polymer exhibits transmission in a visible range of approximately 400 to 700 nm.

* * * * *